(No Model.)

A. J. CALVERT.
NUT LOCK.

No. 599,764.                    Patented Mar. 1, 1898.

Witnesses
L. C. Hills
A. L. Hough

Inventor
William J. Calvert,
by Franklin H. Hough
Attorney

THE NORRIS PETERS CO., PHOTO-LITHO., WASHINGTON, D. C.

UNITED STATES PATENT OFFICE.

WILLIAM J. CALVERT, OF ST. ALBANS, WEST VIRGINIA.

NUT-LOCK.

SPECIFICATION forming part of Letters Patent No. 599,764, dated March 1, 1898.

Application filed November 17, 1897. Serial No. 658,839. (No model.)

*To all whom it may concern:*

Be it known that I, WILLIAM J. CALVERT, a citizen of the United States, residing at St. Albans, in the county of Kanawha and State of West Virginia, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in nut-locks, and especially to a lock for a bolt, in which a pin is employed, which is adapted to be held in a recess leading off from the bore in the nut, the said pin being adapted to bite into the threads of the bolt and securely hold the nut from unscrewing on the said bolt, means being provided to retain the pin in place when the nut is held in a locked relation.

More specifically, the invention resides in the recessing out of the bore of a nut, the said recess being opposite one of the corners of the nut, and of the insertion of a steel key in said recess, the key being first split and adapted to be driven against a wedge-shaped member in the said recess, which will cause the split ends of the retaining-pin to spread, thus securely holding the pin in place to lock the nut to the bolt.

Another part of the invention resides in the peculiar construction of the retaining-pin, which is adapted to be driven into a recess in the nut after the same has been screwed onto the bolt, the outer face of the said pin being brought to a ridge, which ridge extends in the path of the threads of the bolt, and adapted to cut into the same as it is driven into the nut, a portion of the pin being cut away in order to produce a shoulder for turning the parts of the thread which are cut away in one direction, so that when the nut is loosened the said part which has been cut by driving the pin in place will turn back in its former position and allow the nut to be readily removed.

To these ends and to such others as the invention may pertain the same consists in the construction of a nut-lock, which will be hereinafter more fully described, and then specifically defined in the appended claims.

I clearly illustrate my invention in the accompanying drawings, which, with the letters of reference marked thereon, form a part of this specification, and in which drawings—

Figure 1:
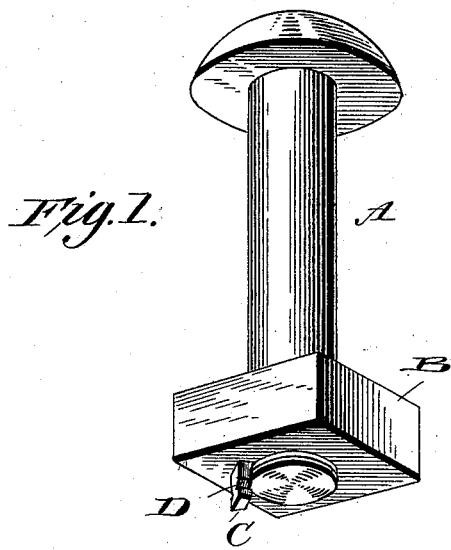
Figure 2:
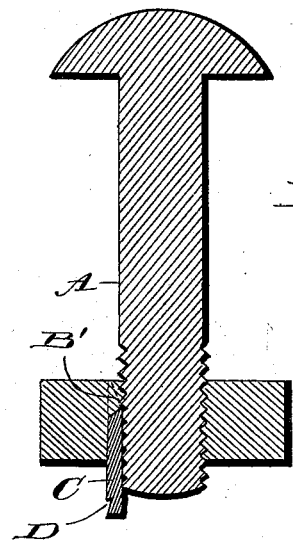
Figure 3:
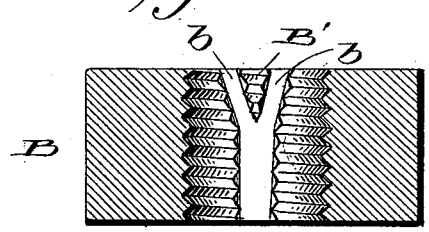
Figures 5, 6:
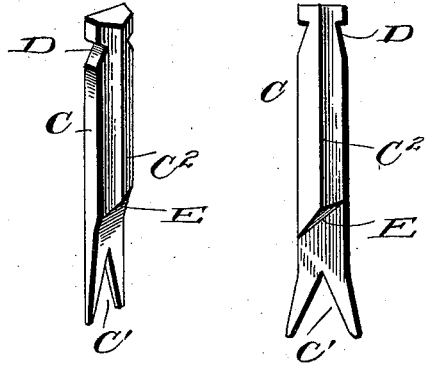
Figure 4:

Figure 1 is a perspective view showing a nut locked in place by my improved locking device. Fig. 2 is a central vertical longitudinal view through the nut-bolt and locking-pin. Fig. 3 is a perspective view of a nut with a part broken away to show the shape of the recess in the bore of the said nut. Fig. 4 is a plan view of a bolt, showing the manner in which the pin cuts into the threads to lock the same to a nut. Fig. 5 is a detail view of the pin before it has been driven into the nut; and Fig. 6 is a detail view showing the shape of the pin after it has been driven into the nut, showing the ends spread apart.

Reference now being had to the details of the drawings by letter, A designates a bolt of ordinary construction, and B a nut which has been recessed out in its inner bore opposite one of the corners. This recessed portion extends nearly through the nut; but near the inner end of the said recess is disposed a wedge-shaped portion B', and from the apex of said wedge-shaped portion the recess separates, forming two channels $b$.

The locking-pin C is made, preferably, of steel and is slit up at one end, as shown at C', and at the opposite end of the said pin are notches D, which are provided for the purpose of allowing the claw of a hammer to engage therein and withdraw the pin from its locking position. This pin is of such a size as to fit snugly in the recess in the said nut, with the beveled or ridged face of the said pin $C^2$ extending out into the bore of the nut, slightly beyond the threads thereof, so that as the pin is driven into the recess after the nut has been screwed onto the bolt the said ridged portion of the pin will cut transversely across the threads, cutting the same in its forward movement. When the slit end of the pin comes in contact with the apex of the wedge-shaped portion at the forked portion of the channel, it will be noted that the ends will follow the channels and will be bent outward, thus retaining the pin in place. In order to turn the cut portion of the threads of the bolt by the insertion of the key or pin, the said pin is cut away as at E, forming a diagonally-disposed shoulder, which turns the furrow of the threads, as it cuts through to the right, and as the nut is withdrawn the said cut portions which are turned back to the right, will, as the nut is unscrewed, turn back into their former places, thus allowing the nut to be readily removed.

I am aware that it is old in the art to recess out a nut and to drive a pin into said recess, the said pin cutting transversely across a series of threads of the bolt, in order to prevent the same from turning, and hence I do not claim such a construction.

Having thus described my invention, what I desire to secure by Letters Patent is—

1. A nut-lock, consisting of a nut recessed out from its inner bore, combined with a bolt, on which said nut is screwed, and a pin having a split end, which is adapted to engage in said recess and the shank of the said pin to cut into the threads of the bolt, and means for turning in opposite directions the split ends of the said pin as it is driven in, as set forth.

2. A nut-lock, consisting of a nut recessed out from its inner bore, a wedge-shaped portion near one end of the said recess, forming two channels in the recess, of the nut combined with a threaded bolt on which said nut is screwed, and a locking-key, which has one end split and notches at its opposite end, the said split portion of the pin adapted to engage with the wedge-shaped portion in the recess as it is driven into the recess of the nut, and across the threads of the bolt, as shown and described.

3. A nut-lock, consisting of a nut recessed out, having a wedge-shaped portion dividing the end of the recess into outwardly-diverging channels, combined with a bolt and a pin slit at one end, having a ridged surface, with a diagonally-disposed shoulder cut across said ridged portion, substantially as and for the purpose set forth.

In testimony whereof I affix my signature in presence of two witnesses.

WILLIAM J. CALVERT.

Witnesses:
   CAL MCKERY,
   THOMAS K. DAVISON.